(12) United States Patent
Nagahara

(10) Patent No.: US 8,482,458 B2
(45) Date of Patent: *Jul. 9, 2013

(54) POSITION DETERMINATION METHOD, POSITIONING DEVICE, AND ELECTRONIC INSTRUMENT

(75) Inventor: Mikio Nagahara, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 213 days.

This patent is subject to a terminal disclaimer.

(21) Appl. No.: 12/855,255

(22) Filed: Aug. 12, 2010

(65) Prior Publication Data

US 2010/0302097 A1    Dec. 2, 2010

Related U.S. Application Data

(63) Continuation of application No. 12/248,363, filed on Oct. 9, 2008, now Pat. No. 7,800,532.

(30) Foreign Application Priority Data

Oct. 12, 2007    (JP) ................................. 2007-266176
Jul. 24, 2008    (JP) ................................. 2008-190641

(51) Int. Cl.
     *G01S 19/42*      (2010.01)
     *G01S 19/31*      (2010.01)

(52) U.S. Cl.
     USPC ................................. 342/357.25; 342/357.71

(58) Field of Classification Search
     USPC    342/357.2, 357.23, 357.25, 357.71; 701/468, 701/469

See application file for complete search history.

(56) References Cited

U.S. PATENT DOCUMENTS

| | | | |
|---|---|---|---|
| 5,757,916 A | 5/1998 | MacDoran et al. | |
| 6,236,354 B1 | 5/2001 | Krasner | |
| 6,313,786 B1 | 11/2001 | Sheynblat et al. | |
| 6,707,422 B2 | 3/2004 | Sheynblat et al. | |
| 7,800,532 B2 * | 9/2010 | Nagahara | 342/357.25 |
| 2003/0236621 A1 | 12/2003 | Sirola et al. | |
| 2006/0022868 A1 | 2/2006 | Awata | |
| 2007/0115171 A1 | 5/2007 | Rahman et al. | |
| 2008/0068258 A1 | 3/2008 | Maezawa et al. | |

FOREIGN PATENT DOCUMENTS

| | | |
|---|---|---|
| JP | 2001-304907 A | 10/2001 |
| JP | 2003-514215 A | 4/2003 |
| JP | 2004-028655 A | 1/2004 |
| JP | 2006-112936 A | 4/2006 |
| JP | 2006-177783 A | 7/2006 |
| JP | 2007-248109 A | 9/2007 |
| WO | WO-00-45191 A2 | 8/2000 |

* cited by examiner

*Primary Examiner* — Dao Phan

(74) *Attorney, Agent, or Firm* — Global IP Counselors, LLP

(57) ABSTRACT

A position determination method includes: performing a positioning process that calculates a located position by performing positioning calculations using satellite signals; determining whether or not a convergence condition is satisfied based on current and preceding positioning results when the positioning process is performed, the convergence condition being specified as a condition for determining whether or not the positioning results of the repeated positioning processes have converged; and determining the located position calculated by the current positioning process to be an output position when the convergence condition is satisfied.

7 Claims, 8 Drawing Sheets

FIG. 2

ALTITUDE TABLE 42

| AREA ID 42a | CENTER POSITION 42b | AREA LENGTH 42c | ALTITUDE 42d |
|---|---|---|---|
| 001 | (xo1, yo1) | L1 | zo1 |
| 002 | (xo2, yo2) | L2 | zo2 |
| 003 | (xo3, yo3) | L3 | zo3 |
| ⋮ | ⋮ | ⋮ | ⋮ |

FIG. 3

POSITIONING RESULT DATA 51

| TIME 51a | DETERMINED CURRENT POSITION 51b | TIME ERROR 51c | OUTPUT DETERMINATION RESULT 51d |
|---|---|---|---|
| t01 | (x1, y1, z1) | T1 | × |
| t02 | (x2, y2, z2) | T2 | × |
| t03 | (x3, y3, z3) | T3 | ○ |
| ⋮ | ⋮ | ⋮ | ⋮ |

FIG. 4

THRESHOLD VALUE TABLE 43

| RECEPTION ENVIRONMENT 43a | ALTITUDE DIFFERENCE THRESHOLD VALUE 43b | POSITION DIFFERENCE THRESHOLD VALUE 43c | TIME DIFFERENCE THRESHOLD VALUE 43d |
|---|---|---|---|
| OPEN-SKY | 100[m] | 50[m] | 0.02[s] |
| MULTIPATH | 300[m] | 100[m] | 0.02[s] |
| INDOOR | 500[m] | 200[m] | 0.03[s] |

POSITION DETERMINATION METHOD, POSITIONING DEVICE, AND ELECTRONIC INSTRUMENT

This is a continuation application of U.S. patent application Ser. No. 12/248,363 which claims priority to Japanese Patent Application No. 2007-266176 filed on Oct. 12, 2007 and Japanese Patent Application No. 2008-190641 filed on Jul. 24, 2008. The entire disclosure of U.S. patent application Ser. No. 12/248,363, and Japanese Patent Application Nos. 2007-266176 and 2008-190641 is hereby incorporated herein by reference.

BACKGROUND

The global positioning system (GPS) has been widely known as a satellite positioning system, and utilized for a car navigation system and the like. A GPS satellite signal is transmitted from each GPS satellite that orbits the earth. A GPS receiver calculates (locates) its current position based on the received GPS satellite signals.

A GPS satellite signal affected by a multipath or the like may be included in the GPS satellite signals acquired by the GPS receiver. The current position may not be calculated (located) accurately when using a GPS satellite signal affected by a multipath or the like. Therefore, the positioning accuracy may be improved by utilizing an altitude table (urban altitude information) in a multipath area in which a number of buildings such as high buildings are present (e.g., the center of Tokyo). The altitude table is a data table in which a central urban area having a small difference in altitude is divided into a given number of (i.e., nine) mesh areas and the altitude corresponding to each area is specified (see JP-A-2006-177783, for example).

A GPS receiver normally repeats positioning calculations for calculating the current position at given time intervals (e.g., intervals of one second), and outputs the calculated current position as the located position. The positioning calculations must be normally performed a plurality of times in order to output the first located position after starting positioning. A time to first fix (TTFF; time required to output the first located position after starting positioning) and the positioning accuracy have a relationship in which the positioning accuracy decreases when giving priority to a reduction in TTFF and the TTFF increases when giving priority to an increase in positioning accuracy. Whether to give priority to an increase in positioning accuracy or a reduction in TTFF is determined corresponding to the reception environment. For example, it is desirable to give priority to an increase in positioning accuracy over a reduction in TTFF in a reception environment with poor positioning accuracy (e.g., multipath environment) so that the located position is output after the Z-count included in the GPS satellite signal has been decoded so that the positioning accuracy has been improved. On the other hand, priority may be given to a reduction in TTFF in an open-sky environment with high positioning accuracy so that the located position is output without waiting for the Z-count to be decoded.

SUMMARY

According to one aspect of the invention, there is provided a position determination method comprising:

performing a positioning process that calculates a located position by performing positioning calculations using satellite signals;

determining whether or not a convergence condition is satisfied based on current and preceding positioning results when the positioning process is performed, the convergence condition being specified as a condition for determining whether or not the positioning results of the repeated positioning processes have converged; and determining the located position calculated by the current positioning process to be an output position when the convergence condition is satisfied.

BRIEF DESCRIPTION OF THE DRAWINGS

FIG. 2 shows a data configuration example of an altitude table.

FIG. 3 shows a data configuration example of positioning result data.

FIG. 4 shows a data configuration example of a threshold value table.

DESCRIPTION OF EXEMPLARY EMBODIMENTS

Figure 1:
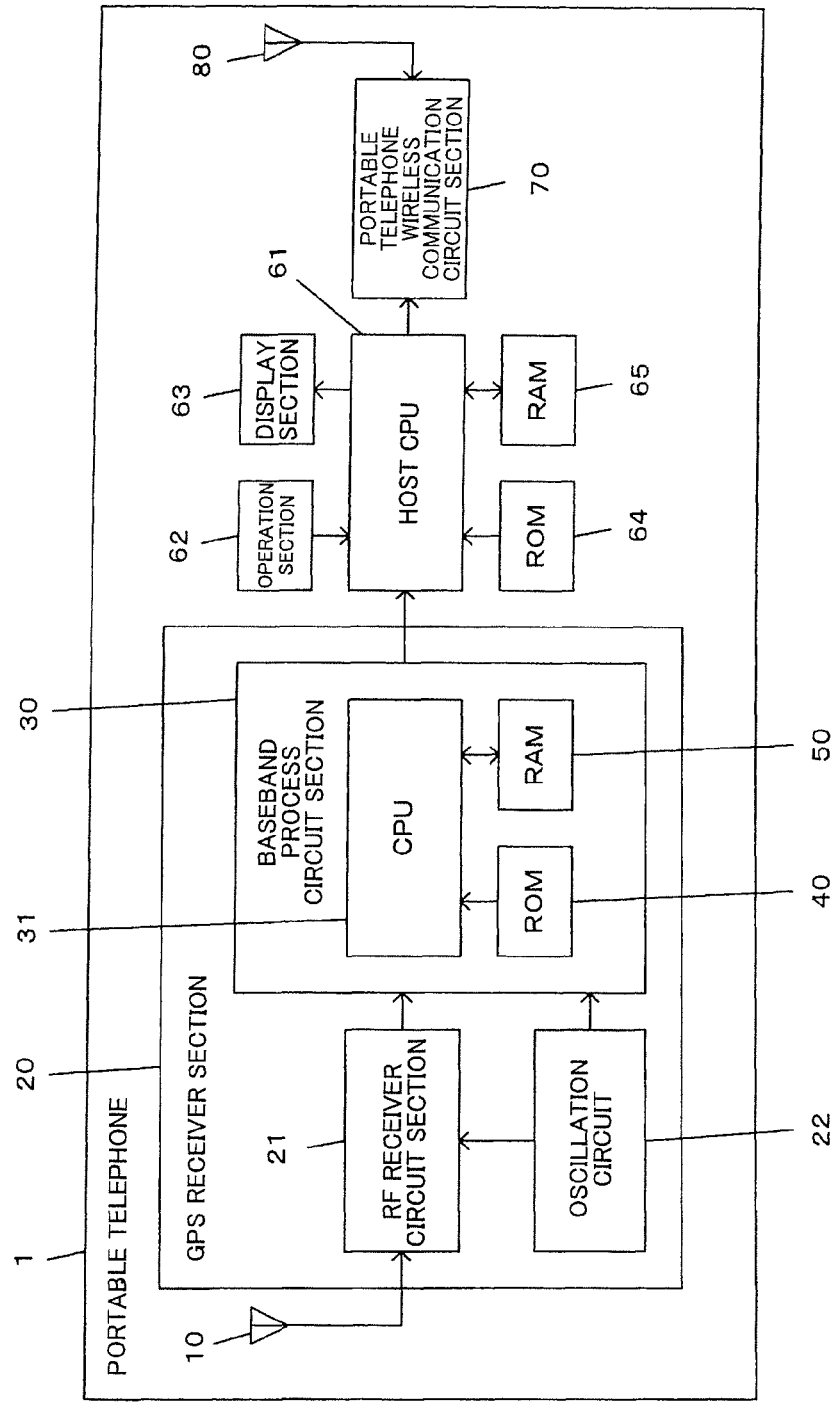
FIG. 1 is a block diagram showing the internal configuration of a portable telephone according to a first embodiment.

The invention may increase the accuracy of the first-output located position. The invention may also appropriately reduce the TTFF corresponding to the reception environment while increasing the accuracy of the first-output located position.

One embodiment of the invention relates to a first-output located position determination method that determines a first-output located position by performing current position positioning calculations using satellite signals transmitted from positioning satellites, the first-output located position being a first located position output after starting positioning, the method comprising: performing a positioning process that calculates a located position by performing positioning calculations using the satellite signals; determining whether or not a convergence condition has been satisfied based on current and preceding positioning results each time the positioning process is performed, the convergence condition being specified as a condition for determining whether or not the positioning results of the repeated positioning processes have converged; and determining the located position calculated by the current positioning process to be the first-output located position when the convergence condition has been satisfied.

Another embodiment of the invention relates to a positioning device comprising: a positioning calculation section that performs a positioning process that calculates a located position by performing positioning calculations using satellite signals transmitted from positioning satellites; a convergence determination section that determines whether or not a convergence condition has been satisfied based on current and preceding positioning results each time the positioning process is performed, the convergence condition being specified as a condition for determining whether or not the positioning results of the repeated positioning processes have converged; and a first-output located position determination section that determines the located position calculated by the current positioning process to be a first-output located position when the convergence determination section has determined that the convergence condition has been satisfied.

Another embodiment of the invention relates to an electronic instrument comprising the above positioning device.

According to the above configuration, whether or not the convergence condition (i.e., a condition for determining whether or not the positioning result of the positioning process has converged) has been satisfied is determined each time the positioning process that calculates the located position by performing positioning calculations using the satellite signals transmitted from the positioning satellites is performed. The located position calculated by the current positioning process is determined to be the first-output located position when the convergence condition has been satisfied.

For example, since the positioning accuracy tends to decrease in an environment in which a satellite signal affected by a multipath or the like is included in the received satellite signals (i.e., multipath environment), the positioning result obtained by each positioning process may vary to a large extent so that the convergence condition may not be satisfied with high probability. As a result, the positioning accuracy is given priority as compared with a reduction in TTFF. On the other hand, since the positioning accuracy is relatively high in an open-sky environment, the positioning result obtained by each positioning process varies to only a small extent so that the convergence condition may be satisfied with high probability. As a result, the TTFF can be reduced. Since the calculated located position is determined to be the first-output located position when the convergence condition has been satisfied, a highly accurate first-output located position can be obtained. Moreover, the TTFF can be appropriately reduced corresponding to the reception environment.

The above first-output located position determination method may further comprise: acquiring a reference altitude corresponding to a two-dimensional position of the located position calculated by the current positioning process from given altitude information or a given server each time the positioning process is performed, and determining whether or not the difference between the altitude of the located position calculated by the current positioning process and the acquired reference altitude satisfies a given altitude difference condition, and the located position calculated by the current positioning process may be determined to be the first-output located position when the altitude difference condition and the convergence condition have been satisfied.

According to this configuration, whether or not the difference between the altitude of the located position calculated by the current positioning process and the acquired reference altitude satisfies the given altitude difference condition is determined each time the positioning process is performed. The located position calculated by the current positioning process is determined to be the first-output located position when the altitude difference condition and the convergence condition have been satisfied.

For example, since the positioning accuracy tends to decrease in a multipath environment, the difference between the calculated located position and the reference altitude is large so that the altitude difference condition may not be satisfied with high probability. Specifically, the convergence condition and the altitude difference condition may not be satisfied with high probability. As a result, the positioning accuracy is given priority as compared with a reduction in TTFF. On the other hand, since the positioning accuracy is relatively high in an open-sky environment, the difference between the calculated located position and the reference altitude is small so that the altitude difference condition may be satisfied with high probability. Specifically, the convergence condition and the altitude difference condition may not be satisfied with high probability. As a result, the TTFF can be reduced. Since the calculated located position is determined to be the first-output located position when the convergence condition and the altitude difference condition have been satisfied, the TTFF can be more appropriately reduced corresponding to the reception environment.

The above first-output located position determination method may further comprise determining a reception environment of the satellite signals; and changing the altitude difference condition corresponding to the determined reception environment.

According to this configuration, the altitude difference condition is changed corresponding to the reception environment of the satellite signals. When the altitude difference condition differs, the determination result as to whether or not the altitude difference condition has been satisfied differs even if the located position is the same. As a result, the time required to determine the first-output located position after starting positioning (i.e., TTFF) differs. Since the positioning accuracy differs corresponding to the reception environment, the difference between the altitude of the located position and the reference altitude also differs. As a result, the determination result as to whether or not the altitude difference condition has been satisfied differs. For example, in a reception environment in which the positioning accuracy is relatively high (e.g., open-sky environment), the difference between the altitude of the located position and the reference altitude is small so that the altitude difference condition may be satisfied with high probability. On the other hand, in a reception environment in which the positioning accuracy is relatively low (e.g., multipath environment), the difference between the altitude of the located position and the reference altitude is large so that the altitude difference condition may not be satisfied with high probability. Specifically, when the altitude difference condition is set to be identical irrespective of the reception environment, the altitude difference condition may not be satisfied in a reception environment in which the positioning accuracy is relatively low (e.g., multipath environment), whereby the TTFF may increase to a large extent. Therefore, the first-output located position is more appropriately determined by changing the altitude difference condition corresponding to the reception environment.

The above first-output located position determination method may further comprise determining a reception environment of the satellite signals; and changing the convergence condition corresponding to the determined reception environment.

According to this configuration, the convergence condition is changed corresponding to the reception environment of the satellite signals. When the convergence condition is changed, the determination result as to whether or not the convergence condition has been satisfied differs even if the positioning result is the same. As a result, the TTFF also differs. Since the positioning result varies to a different extent corresponding to the reception environment due to the difference in positioning accuracy, the determination result as to whether or not the convergence condition has been satisfied also differs. For example, since the positioning result varies to only a small extent in a reception environment in which the positioning accuracy is relatively high (e.g., open-sky environment), the convergence condition may be satisfied with high probability. On the other hand, since the positioning result varies to a large extent in a reception environment in which the positioning accuracy is relatively low (e.g., multipath environment), the convergence condition may not be satisfied with high probability. Specifically, when the convergence condition is set to be identical irrespective of the reception environment, the convergence condition may not be satisfied in a reception environment in which the positioning accuracy is relatively low (e.g., multipath environment), whereby the TTFF may increase to a large extent. Therefore, the first-output located position is more appropriately determined by changing the convergence condition corresponding to the reception environment.

In the above first-output located position determination method, the determining of whether or not the convergence condition has been satisfied may include determining the number of times that the difference between the located positions calculated by successive positioning processes among the repeated positioning processes has successively satisfied a given short distance condition.

According to this configuration, whether or not the convergence condition has been satisfied is determined by determining the number of times that the difference between the located positions calculated by successive positioning processes among the repeated positioning processes has successively satisfied the given short distance condition. Therefore, it can be determined that the convergence condition has been satisfied when a variation in located position in time series has become small (converged) by determining whether or not the convergence condition has been satisfied by determining whether or not the number of times that the short distance condition has been satisfied successively is greater than a given number, for example.

The above first-output located position determination method may further comprise determining a reception environment of the satellite signals; and changing the short distance condition corresponding to the determined reception environment.

According to this configuration, the short distance condition is changed corresponding to the reception environment determined based on the received satellite signals. When the short distance condition is changed, the determination result as to whether or not the short distance condition has been satisfied differs even if the positioning result of the positioning process is the same. As a result, the determination result as to whether or not the convergence condition has been satisfied differs. Since the positioning result varies to a different extent corresponding to the reception environment due to the difference in positioning accuracy, the determination result as to whether or not the short distance condition has been satisfied also differs. Therefore, the first-output located position is more appropriately determined by changing the short distance condition corresponding to the reception environment.

In the above first-output located position determination method, the performing of the positioning process may include calculating a time error by the positioning process; and the determining of whether or not the convergence condition has been satisfied may include determining the number of times that the difference between the time errors calculated by successive positioning processes among the repeated positioning processes has successively satisfied a given approximation condition.

According to this configuration, the time error is calculated by the positioning process, and whether or not the convergence condition has been satisfied is determined by determining the number of times that the difference between the time errors calculated by successive positioning processes among the repeated positioning processes has successively satisfied the given approximation condition. Therefore, it can be determined that the convergence condition has been satisfied when a variation in time error in time series has become small (converged) by determining whether or not the convergence condition has been satisfied by determining whether or not the number of times that the convergence condition has been satisfied successively is greater than a given number, for example.

The above first-output located position determination method may further comprise determining a reception environment of the satellite signals; and changing the approximation condition corresponding to the determined reception environment.

According to this configuration, the approximation condition is changed corresponding to the reception environment determined based on the received satellite signals. When the approximation condition is changed, the determination result as to whether or not the approximation condition has been satisfied differs even if the positioning result of the positioning process is the same. As a result, the determination result as to whether or not the convergence condition has been satisfied differs. Since the positioning result varies to a different extent corresponding to the reception environment due to the difference in positioning accuracy, the determination result as to whether or not the approximation condition has been satisfied also differs. Therefore, the first-output located position is more appropriately determined by changing the approximation condition corresponding to the reception environment.

A further embodiment of the invention relates to a program that causes a computer to execute the above first-output located position determination method, the computer being included in a positioning device that locates a current position using satellite signals transmitted from positioning satellites.

Preferred embodiments of the invention are described below with reference to the drawings. In the following embodiments, the invention is applied to a portable telephone having a GPS positioning function. Note that embodiments to which the invention may be applied are not limited to the following embodiments.

First Embodiment

A first embodiment is described below.

Configuration

FIG. 1 is a block diagram showing the internal configuration of a portable telephone 1 according to the first embodiment. As shown in FIG. 1, the portable telephone 1 includes a GPS antenna 10, a GPS receiver section (i.e., positioning device) 20, a host central processing unit (CPU) 61, an operation section 62, a display section 63, a read-only memory (ROM) 64, a random access memory (RAM) 65, a portable telephone wireless communication circuit section 70, and a portable telephone antenna 80.

The GPS antenna 10 is an antenna that receives an RF signal including a GPS satellite signal transmitted from a GPS satellite. The GPS antenna 10 outputs the received RF signal.

The GPS receiver section 20 acquires/extracts the GPS satellite signal from the RF signal received by the GPS antenna 10, and calculates the current position of the portable telephone 1 by performing positioning calculations based on a navigation message extracted from the GPS satellite signal and the like. The GPS receiver section 20 includes a radio frequency (RF) receiver circuit section 21, an oscillation circuit 22, and a baseband process circuit section 30. The RF receiver circuit section 21 and the baseband process circuit section 30 may be produced as different large scale integrated (LSI) circuits, or may be produced in one chip.

The RF receiver circuit section 21 multiplies the RF signal input from the GPS antenna 10 by a signal obtained by dividing or multiplying the frequency of the oscillation signal input from the oscillation circuit 22 to down-convert the RF signal into an intermediate-frequency signal (IF signal). The RF receiver circuit section 21 amplifies the IF signal, converts the amplified signal into a digital signal using an A/D converter, and outputs the digital signal, for example. The oscillation circuit 22 is a crystal oscillator, for example. The oscillation circuit 22 generates and outputs an oscillation signal having a given oscillation frequency.

The baseband process circuit section 30 is a circuit section that acquires/tracks the GPS satellite signal from the IF signal input from the RF receiver circuit section 21, and performs pseudo-range calculations, positioning calculations, and the like based on a navigation message and time information extracted by decoding data and the like.

Specifically, the baseband process circuit section 30 acquires the GPS satellite signal based on the input IF signal. The baseband process circuit section 30 acquires the GPS satellite signal by extracting the GPS satellite signal from the IF signal by performing a correlation process on the IF signal. Specifically, the baseband process circuit section 30 performs a coherent process that calculates the correlation between the IF signal and a pseudo-generated C/A code replica (code replica) using FFT calculations, and an incoherent process that integrates the correlation values (i.e., the results of the coherent process) to calculate an integrated correlation value. As a result, the phases of a C/A code and a carrier frequency contained in the GPS satellite signal are obtained.

After acquiring the GPS satellite signal, the baseband process circuit section 30 tracks the acquired GPS satellite signal. The baseband process circuit section 30 tracks the acquired GPS satellite signal by synchronously holding a plurality of acquired GPS satellite signals in parallel. For example, the baseband process circuit section 30 performs a code loop process that is implemented by a delay locked loop (DLL) and tracks the phase of the C/A code, and a carrier loop process that is implemented by a phase locked loop (PLL) and tracks the phase of the carrier frequency. The baseband process circuit section 30 decodes the data contained in the tracked GPS satellite signal to extract the navigation message, and performs pseudo-range calculations, positioning calculations, and the like to calculate (locate) the current position.

The baseband process circuit section 30 includes a CPU 31, a ROM 40, and a RAM 50. The baseband process circuit section 30 also includes various circuits such as a C/A code replica generation circuit, a correlation calculation circuit, and a data decoder circuit.

The CPU 31 controls each section of the baseband process circuit section 30 and the RF receiver circuit section 21, and performs various calculations including a baseband process described below.

In the baseband process, the CPU 31 decodes the navigation message included in the acquired and tracked GPS satellite signal, and calculates the current position of the portable telephone 1 based on orbit information and time information relating to the GPS satellite included in the decoded navigation message. Specifically, the CPU 31 calculates the position of each GPS satellite and the pseudo-range between the GPS receiver and each GPS satellite when the GPS satellite has transmitted the GPS satellite signal based on the difference between the time when each GPS satellite has transmitted the GPS satellite signal and the time when the GPS receiver has received the GPS satellite signal. The CPU 31 calculates the current position by solving simultaneous equations in which the current position and a time error between the GPS satellite and the GPS receiver are unknown quantities. The CPU 31 can calculate the current position by receiving the GPS satellite signals from at least four GPS satellites. This is because the coordinate values (x,y,z) of the current position (i.e., three-dimensional position) and a time error T between the GPS satellite and the GPS receiver are used as unknown quantities.

The CPU 31 repeats a positioning process that calculates the current position at given time intervals (e.g., intervals of one second). In the positioning process, the CPU 31 selects satellite sets (e.g., combinations of four or more GPS satellites) based on the acquired GPS satellite signals. For example, when eight GPS satellite signals have been acquired, the CPU 31 selects 163 ($=_8C_8+_8C_7+_8C_6+_8C_5+_8C_4$) satellite sets. The CPU 31 then performs positioning calculations corresponding to each selected satellite set using a least-square method or the like to calculate current position candidates of the portable telephone 1 and time error candidates. The CPU 31 selects one satellite set from the satellite sets based on given criteria, for example. The CPU 31 determines the current position candidate corresponding to the selected satellite set to be the determined current position P, and determines the time error candidate corresponding to the selected satellite set to be the current time error T. As the criteria, a position dilution of precision (PDOP) based on the constellation of the GPS satellites included in the satellite set, or the signal strength of each GPS satellite signal may be used, for example. Note that about several tens of satellite sets made up of six or more GPS satellites may be extracted from the satellite sets generated based on the acquired GPS satellite signals, and the located position and the time error may be determined based on the extracted satellite sets, for example.

In the first embodiment, the positioning process is performed one or more times when outputting the first located position (first positioning), and the determined current position P calculated by the final positioning process is output as the first located position. After the first located position has been determined, the determined current position P calculated by each positioning process is output as the located position.

In the first positioning, when the determined current position P and the time error T have been calculated by each positioning process, the CPU 31 determines whether or not the determined current position P and the time error T thus calculated respectively satisfy a given altitude difference condition and a given convergence condition.

The altitude difference condition is a condition relating to the altitude z of the calculated determined current position P (i.e., a condition for determining whether or not the difference between the altitude z and a reference altitude is small). Specifically, the CPU 31 acquires an altitude z0 corresponding to the horizontal position (i.e., latitude and longitude (two-dimensional position)) of the determined current position P referring to an altitude table. The altitude z0 is the reference altitude. The term "altitude table" refers to a data table that defines an altitude corresponding to each area (divided area) into which the earth's surface is divided in the shape of a mesh. Each divided area has a square shape and is defined so that each side of the square extends along the latitude direction or the longitude direction. The altitude may be an arbitrary altitude (e.g., ellipsoidal height or altitude above sea level).

FIG. 2 shows an example of an altitude table 42. As shown in FIG. 2, the altitude table 42 stores an area ID 42a (i.e., the identification number of each divided area), a center position 42b, an area length 42c (i.e., the length of each side), and an altitude 42*c* corresponding to each divided area. The latitude and the longitude are stored as the center position 42*b*.

The CPU 31 calculates the difference (altitude difference) Δz between the altitude z0 corresponding to the horizontal position of the determined current position P acquired from the altitude table 42 and the altitude z of the determined current position P, and compares the calculated altitude difference Δz with a given altitude difference threshold value THz (e.g., 200 m). The CPU 31 determines that the altitude difference condition is satisfied when the altitude difference Δz is equal to or less than the altitude difference threshold value THz, and determines that the altitude difference condition is not satisfied when the altitude difference Δz is greater than the altitude difference threshold value THz.

The convergence condition is a condition relating to the results of the positioning process (i.e., a condition for determining whether or not the determined current position P and the time error T (i.e., positioning results) have converged). Specifically, the CPU 31 calculates the difference (position difference) ΔP between the determined current position P0 calculated by the current positioning process and the determined current position P calculated by the preceding positioning process. When the calculated position difference ΔP is equal to or less than a position difference threshold value THp (e.g., 200 m), a position counter is incremented by one. When the calculated position difference ΔP is greater than the position difference threshold value THp, the position counter is cleared to zero. The position counter has been cleared to zero when starting positioning. Specifically, the position counter counts the number of times that the position difference ΔP has consecutively become equal to or less than the position difference threshold value THp.

The CPU 31 also calculates the difference (time difference) ΔT between the current time error T and a time error T0 calculated by the preceding positioning process. When the calculated time difference ΔT is equal to or less than a time difference threshold value THt (e.g., 0.02 seconds), a time counter is incremented by one. When the calculated time difference ΔT is greater than the time difference threshold value THt, the time counter is cleared to zero. The time counter has been cleared to zero when starting positioning. Specifically, the time counter counts the number of times that the time difference ΔT has consecutively become equal to or less than the time difference threshold value THt.

The CPU 31 compares the position counter value and the time counter value with a given position counter threshold value THcp (e.g., "5") and a given time counter threshold value THct (e.g., "5"), respectively. When the position count value is equal to or greater than the position counter threshold value THcp, or the time count value is equal to or greater than the time counter threshold value THct, the CPU 31 determines that the convergence condition has been satisfied. When the position count value is less than the position counter threshold value THcp, or the time count value is less than the time counter threshold value THct, the CPU 31 determines that the convergence condition has not been satisfied.

When the CPU 31 has determined that the altitude difference condition and the convergence condition have been satisfied, the CPU 31 determines the determined current position P calculated by the current positioning process to be the first located position, and outputs the determined current position P to the host CPU 61 in the subsequent stage, for example. When the CPU 31 has determined that at least one of the altitude difference condition and the convergence condition has not been satisfied, the CPU 31 performs the next positioning process.

After the Z-count contained in each subframe of the GPS satellite signal has been decoded, a variation in the time error T becomes almost zero even in a multipath environment. Therefore, when the Z-count has been decoded, the CPU 31 determines the determined current position P to be the first located position and outputs the determined current position P irrespective of whether or not each of the altitude difference condition and the convergence condition has been satisfied.

The results of the positioning process performed by the CPU 31 are stored as positioning result data 51. FIG. 3 shows an example of the data configuration of the positioning result data 51. As shown in FIG. 3, a positioning time 51*a*, a calculated determined current position 51*b*, a time error 51*c*, and an output determination result 51*d* are stored as the positioning result data 51 corresponding to each positioning process performed after starting positioning. The output determination result 51*d* indicates whether or not to output the determined current position as the located position.

The CPU 31 changes each threshold value TH (altitude difference threshold value THz, position difference threshold value THp, and time difference threshold value THt) depending on the reception environment corresponding to each positioning process. The reception environment is determined based on the signal strength of the received GPS satellite signal and the PDOP, for example. The CPU 31 changes each threshold value TH to a value corresponding to the determined reception environment referring to a threshold value table 43.

Figure 5:
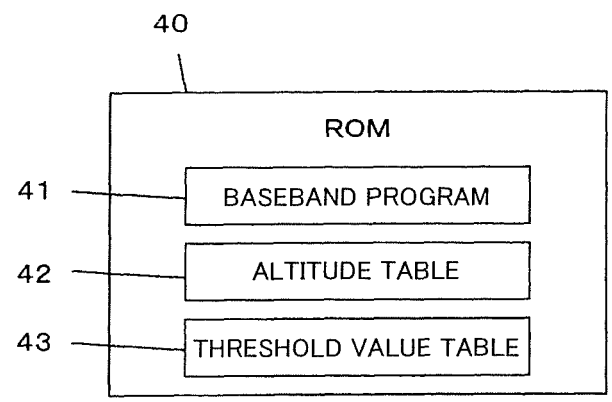
FIG. 5 shows a configuration example of a ROM.

FIG. 4 shows an example of the threshold value table 43. As shown in FIG. 5, an altitude difference threshold value 43*b*, a position difference threshold value 43*c*, and a time difference threshold value 43*d* are stored in the threshold value table 43 corresponding to each reception environment 43*a*. Each threshold value TH is set to be smaller as the positioning accuracy under the reception environment becomes higher. This is because the positioning accuracy differs corresponding to the reception environment. For example, since the positioning accuracy is high in an open-sky environment as compared with other environments (i.e., the altitude difference Δz, the time difference ΔT, and the position difference ΔP are small), each threshold value TH is set to be a small value. On the other hand, since the positioning accuracy is low in a multipath environment or an indoor environment as compared with the open-sky environment (i.e., each error is large), each threshold value TH is set to be a large value.

Again referring to FIG. 1, the ROM 40 stores a system program which causes the CPU 31 to control each section of the baseband process circuit section 30 and the RF receiver circuit section 21, and a program and data necessary for the CPU 31 to implement various processes including the baseband process. FIG. 5 shows an example of the configuration of the ROM 40. As shown in FIG. 5, the ROM 40 stores a baseband process program 41, the altitude table 42, and the threshold value table 43.

Figure 6:
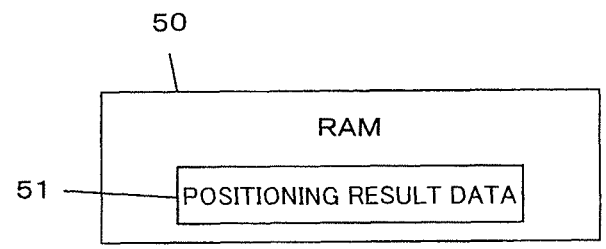
FIG. 6 shows a configuration example of a RAM.

The RAM 50 is used as a work area for the CPU 31, and temporarily stores a program and data read from the ROM 40, results of calculations performed by the CPU 31 based on various programs, and the like. FIG. 6 shows an example of the configuration of the RAM 50. As shown in FIG. 6, the RAM 50 stores the positioning result data 51.

Again referring to FIG. 1, the host CPU 61 controls each section of the portable telephone 1 based on various programs such as the system program stored in the ROM 64. Specifically, the host CPU 61 mainly implements a telephone call function, and performs a process for implementing various functions including a navigation function such as causing the display section 63 to display a navigation screen in which the current position of the portable telephone 1 input from the baseband process circuit section 30 is plotted on a map.

The operation section 62 is an input device including an operation key, a button switch, and the like. The operation section 62 outputs an operation signal corresponding to the operation of the user to the host CPU 61. Various instructions such as a positioning start/finish instruction are input by operating the operation section 62. The display section 63 is a display device such as a liquid crystal display (LCD). The display section 63 displays a display screen (e.g., navigation screen and time information) based on a display signal input from the host CPU 61.

The ROM 64 stores a system program that causes the host CPU 61 to control the portable telephone 1, a program and data necessary for implementing the navigation function, and the like. The RAM 65 is used as a work area for the host CPU 61. The RAM 65 temporarily stores a program and data read from the ROM 64, data input from the operation section 62, calculation results of the host CPU 61 based on various programs, and the like.

The portable telephone antenna 80 is an antenna which transmits and receives a portable telephone radio signal between the portable telephone 1 and a radio base station installed by a communication service provider of the portable telephone 1. The portable telephone wireless communication circuit section 70 is a portable telephone communication circuit section that includes an RF conversion circuit, a baseband process circuit, and the like, and transmits and receives a radio signal under control of the host CPU 61.

Process Flow

Figure 7:
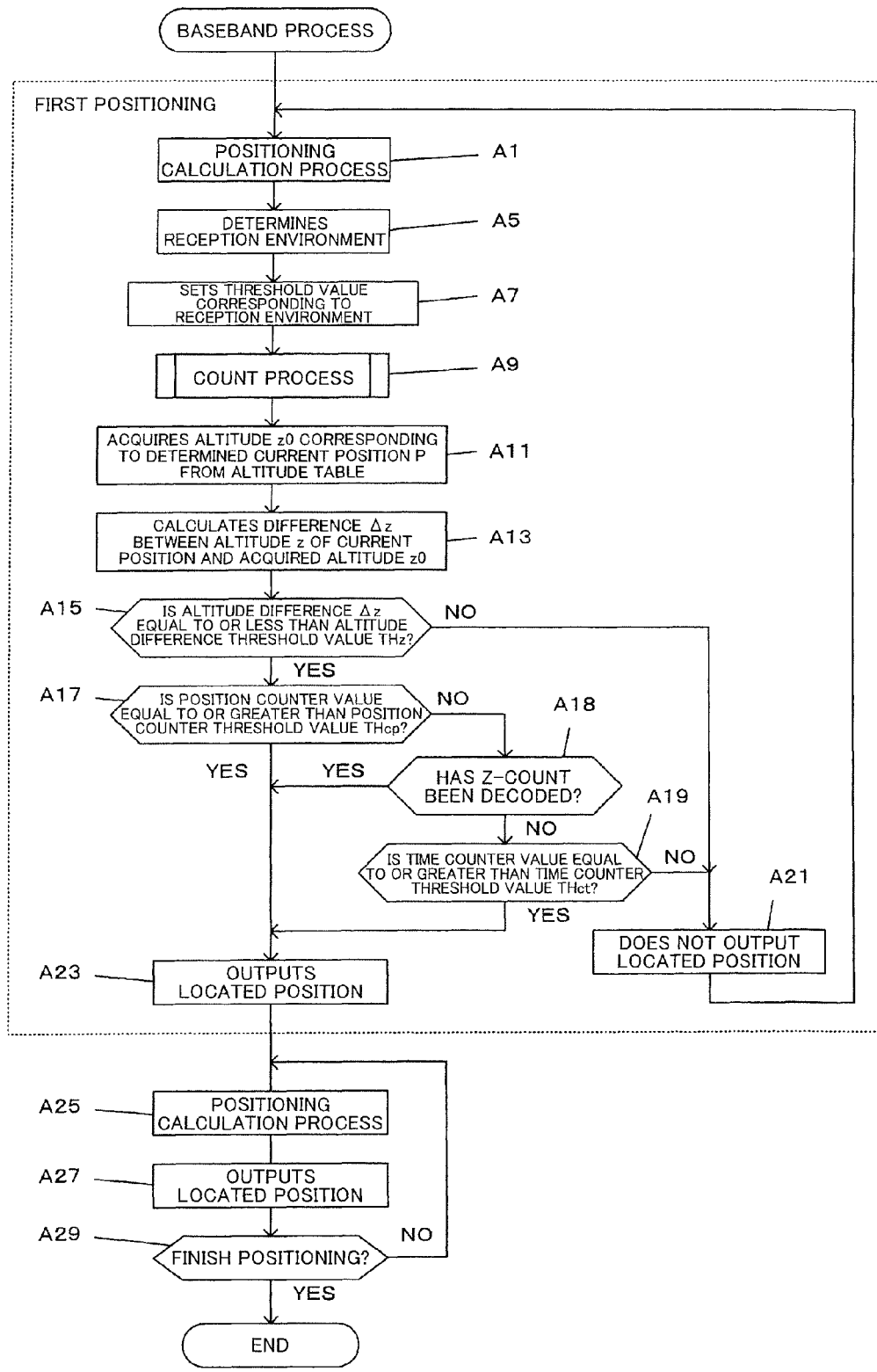
FIG. 7 is a flowchart showing a baseband process.

FIG. 7 is a flowchart illustrative of the flow of the baseband process performed by the CPU 31. The baseband process is implemented by causing the CPU 31 to execute a process based on the baseband program 41. Note that a digital IF signal obtained by down-converting an RF signal received by the GPS antenna 10 into an IF signal by the RF receiver circuit section 21 is input to the baseband process circuit section 30 before the baseband process.

As shown in FIG. 7, the CPU 31 performs a positioning calculation process to calculate the determined current position P and the time error T (step A1). The CPU 31 then determines the reception environment based on the received GPS satellite signal (step A5). The CPU 31 sets the threshold values according to the threshold value table 43 based on the determined reception environment (step A7). The CPU 31 then performs a count process to update the counter values (step A9).

Figure 8:
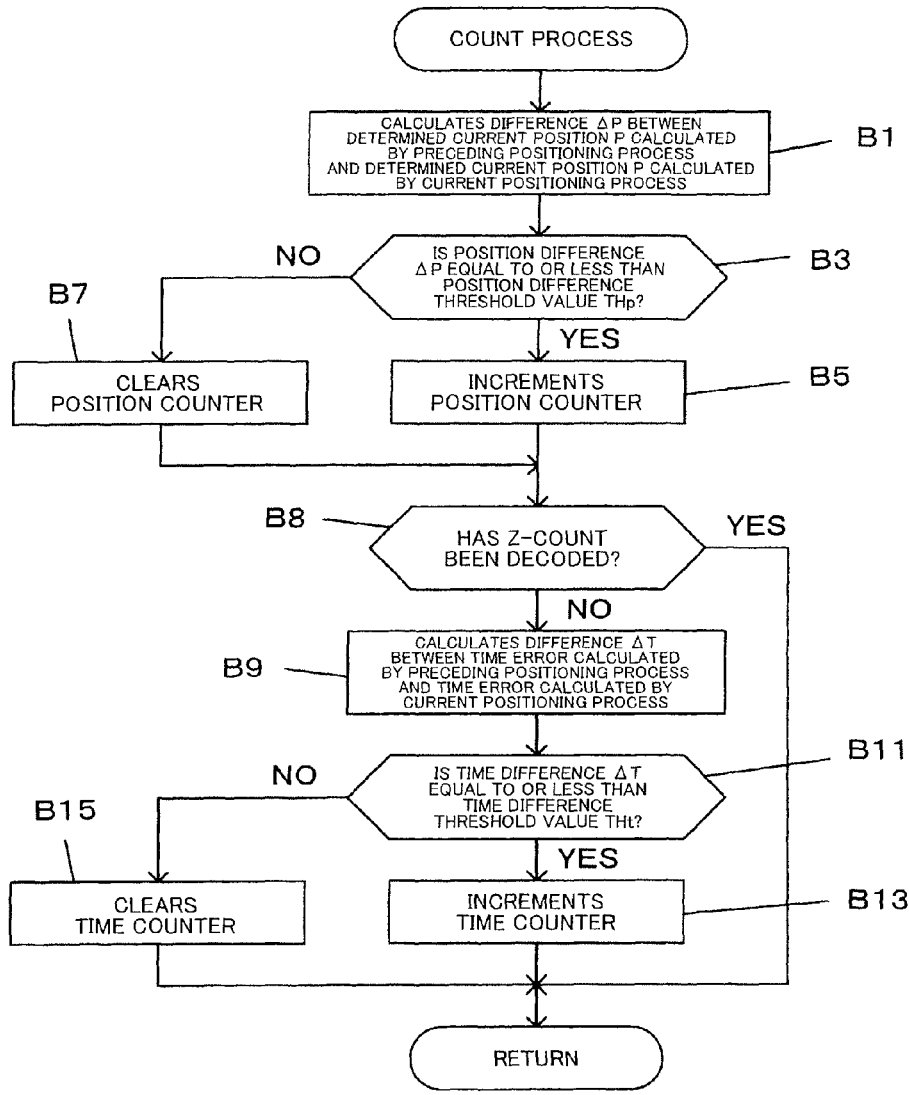
FIG. 8 is a flowchart showing a count process performed during a baseband process.

FIG. 8 is a flowchart illustrative of the flow of the count process. As shown in FIG. 8, the CPU 31 calculates the difference (position difference) ΔP between the determined current position P calculated by the preceding positioning process and the determined current position P calculated by the current positioning process (step B1). When the calculated position difference ΔP is equal to or less than the position difference threshold value THp (step B3: YES), the position counter is incremented by one (step B5). When the calculated position difference ΔP is greater than the position difference threshold value THp (step B3: NO), the position counter is cleared to zero (step B7).

The CPU 31 then determines that the Z-count has been decoded. When the CPU 31 has determined that the Z-count has not been decoded (step B8: NO), the CPU 31 calculates the difference (time difference) ΔT between the time error T calculated by the preceding positioning process and the time error T calculated by the current positioning process (step B9). When the calculated time difference ΔT is equal to or less than the time difference threshold value THt (step B11: YES), the time counter is incremented by one (step B13). When the calculated time difference ΔT is greater than the time difference threshold value THt (step B11: NO), the time counter is cleared to zero (step B15). The CPU 31 thus completes the count process.

After the count process, the CPU 31 acquires the altitude z0 corresponding to the determined current position P referring to the altitude table 42 (step A11), and calculates the difference (altitude difference) Δz between the acquired altitude z0 and the altitude z of the determined current position P (step A13). The CPU 31 compares the calculated altitude difference Δz with the altitude difference threshold value THz. When the altitude difference Δz is less than the altitude difference threshold value THz (step A15: YES), the CPU 31 compares the position counter value with the position counter threshold value THcp. When the position counter value is equal to or greater than the position counter threshold value THcp (step A17: YES), the CPU 31 determines the determined current position P calculated by the current positioning process to be the first located position, and outputs the determined current position P (step A23).

When the position counter value is less than the position counter threshold value THcp (step A17: NO), the CPU 31 determines whether or not the Z-count has been decoded. When the CPU 31 has determined that the Z-count has been decoded (step A18: YES), the CPU 31 determines the determined current position P calculated by the current positioning process to be the first located position, and outputs the determined current position P (step A23). When the CPU 31 has determined that the Z-count has not been decoded (step A18: NO), the CPU 31 compares the time counter value with the time counter threshold value THct. When the time counter value is equal to or greater than the time counter threshold value THct (step A19: YES), the CPU 31 determines the determined current position P calculated by the current positioning process to be the first located position, and outputs the determined current position P (step A23).

When the time counter value is less than the time counter threshold value THct (step A19: NO), or the altitude difference Δz is greater than the altitude difference threshold value THz (step A15: NO), the CPU 31 does not output the determined current position P calculated by the current positioning process as the first located position (step A21). The CPU 31 then returns to the step A1 and performs the next positioning. The first positioning is thus completed.

After completion of the first positioning, the CPU 31 performs second or subsequent positioning. Specifically, the CPU 31 performs positioning calculations to calculate the determined current position P (step A25), and outputs the calculated determined current position P as the located position (step A27). The CPU 31 then determines whether or not to finish positioning. When the CPU 31 has determined to continue positioning (step A29: NO), the CPU 31 returns to the step A25 and performs the next positioning. When the CPU 31 has determined to finish positioning (step A29: YES), the CPU 31 finishes the baseband process.

Effects

According to the first embodiment, the positioning process that calculates the determined current position P based on the acquired GPS satellite signals is performed one or more times during the first positioning. When the determined current position P and the time error T have been calculated by each positioning process, the CPU 31 determines whether or not the determined current position P and the time error T respectively satisfy the given altitude difference condition and the given convergence condition. When the CPU 31 has determined that at least one of the altitude difference condition and the convergence condition has been satisfied, the CPU 31 outputs the determined current position P as the first located position. After the first located position has been determined and output, the determined current position P calculated by each positioning process is output as the located position. This enables whether to give priority to an increase in positioning accuracy or a reduction in TTFF to be appropriately determined corresponding to the reception environment.

Specifically, in a reception environment in which the positioning accuracy is relatively low (e.g., multipath environment), the difference between the calculated determined current position P and the reference altitude is large so that the altitude difference condition may not be satisfied with high probability. Moreover, the positioning results obtained by each positioning process vary to a large extent so that the convergence condition may not be satisfied with high probability. Specifically, the altitude difference condition and the convergence condition may not be satisfied with high probability. As a result, the positioning accuracy is given priority as compared with a reduction in TTFF. On the other hand, in a reception environment in which the positioning accuracy is relatively high (e.g., open-sky environment), the difference between the calculated determined current position P and the reference altitude is small so that the altitude difference condition may be satisfied with high probability. Moreover, the positioning results obtained by each positioning process vary to a small extent so that the convergence condition may be satisfied with high probability. Specifically, the altitude difference condition and the convergence condition may be satisfied with high probability. As a result, the TTFF can be reduced.

Second Embodiment

A second embodiment is described below. In the second embodiment, the same elements as those of the first embodiment are indicated by the same symbols. Detailed description of these elements is omitted or simplified.

Configuration

The configuration of a portable telephone according to the second embodiment is similar to that of the portable telephone 1 according to the first embodiment. The second embodiment differs from second embodiment as to the determination on whether or not the Z-count contained in each subframe of the GPS satellite signal has been decoded. Specifically, a variation in the time error T becomes almost zero even in the multipath environment after the Z-count has been decoded, as described above. Therefore, when the Z-count has been decoded, the CPU 31 determines the determined current position P to be the first located position and outputs the determined current position P irrespective of whether or not each of the altitude difference condition and the convergence condition has been satisfied. On the other hand, it may be unnecessary to wait for the Z-count to be decoded depending on the positioning accuracy due to the reception environment. For example, since the positioning accuracy is high in the open-sky environment as compared with other environments, the first located position may be output without waiting for the Z-count to be decoded. On the other hand, since the positioning accuracy is low in the multipath environment or the indoor environment as compared with the open-sky environment, it is desirable to output the first located position after the Z-count has been decoded.

Specifically, the CPU 31 determines whether or not to wait for the Z-count to be decoded in the baseband process referring to a Z-count wait table 44.

Figure 9:
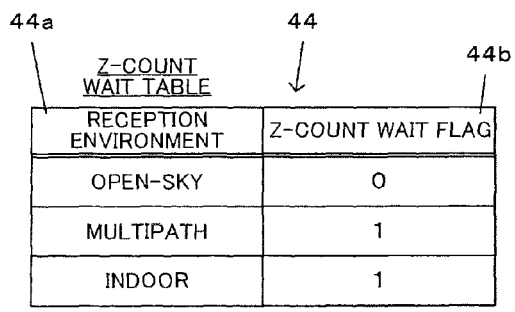
FIG. 9 shows a data configuration example of a Z-count wait table according to a second embodiment.

FIG. 9 is a view showing an example of the data configuration of the Z-count wait table 44. As shown in FIG. 9, a Z-count decode wait flag 44$b$ is stored in the Z-count wait table 44 corresponding to each reception environment 44$a$. The Z-count wait flag 44$b$ is set at "0" that indicates that it is unnecessary to wait for the Z-count to be decoded in the open-sky environment in which the positioning accuracy is a relatively high, and is set at "1" that indicates that it is necessary to wait for the Z-count to be decoded in the multipath environment or the indoor environment in which the positioning accuracy is a relatively low.

Figure 10:
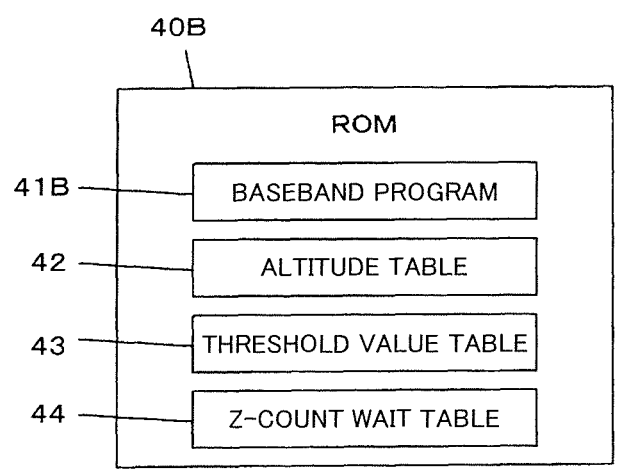
FIG. 10 shows a configuration example of a ROM.

FIG. 10 is a view showing an example of the configuration of a ROM 40B according to the second embodiment. As shown in FIG. 10, the ROM 40B stores a baseband process program 41B, the altitude table 42, the threshold table 43, and the Z-count wait table 44.

Process Flow

Figure 11:
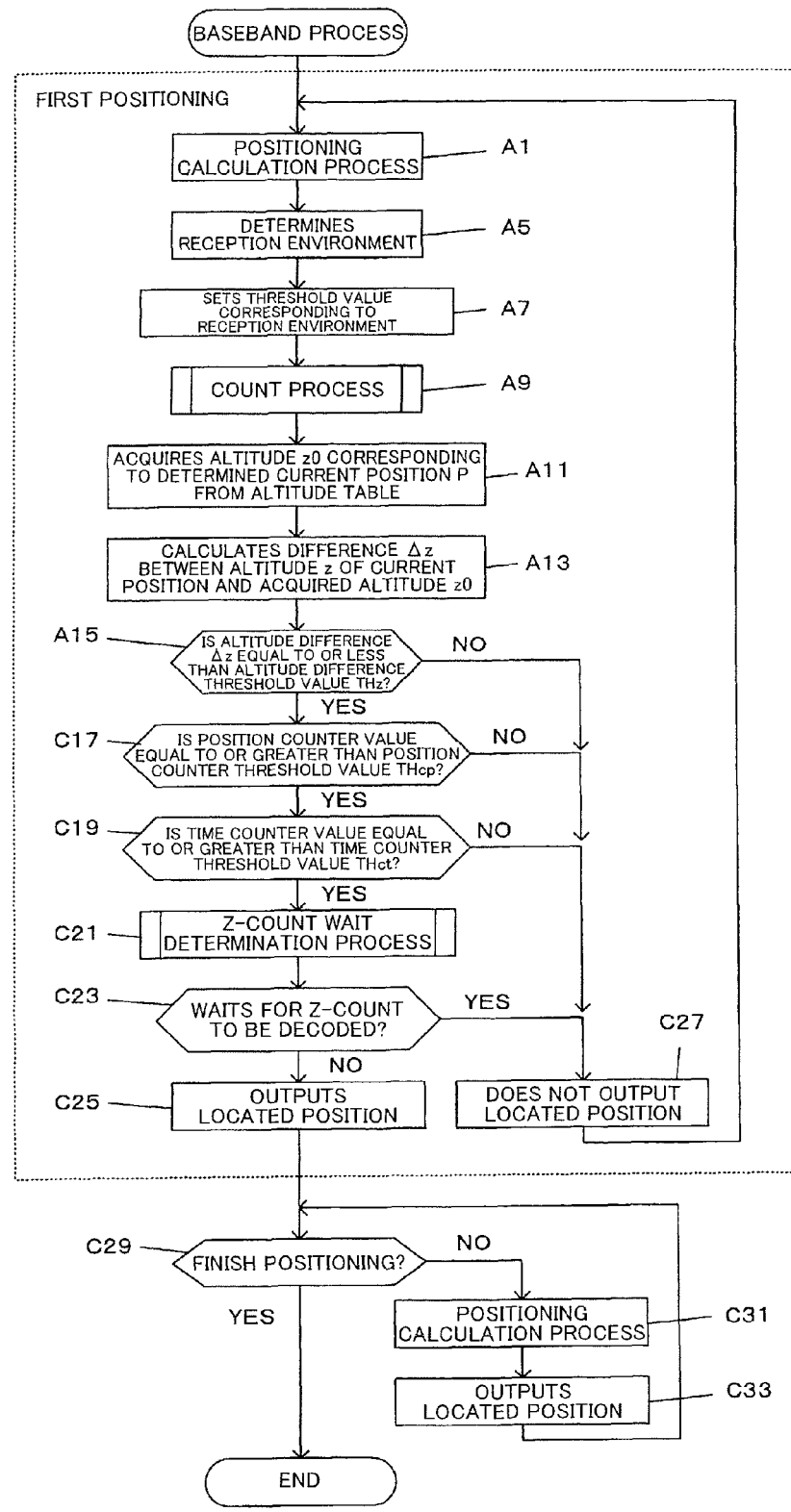
FIG. 11 is a flowchart showing a baseband process.

FIG. 11 is a flowchart illustrative of the flow of a baseband process according to the second embodiment. The baseband process is implemented by causing the CPU 31 to execute a process based on the baseband program 41B.

As shown in FIG. 11, the CPU 31 performs a positioning calculation process to calculate the determined current position P and the time error T (step A1). The CPU 31 then determines the reception environment based on the received GPS satellite signal (step A5). The CPU 31 sets the threshold values according to the threshold value table 43 based on the determined reception environment (step A7). The CPU 31 then performs the count process (see FIG. 8) to change the counter values (step A9).

After the count process, the CPU 31 acquires the altitude z0 corresponding to the determined current position P referring to the altitude table 42 (step A11), and calculates the difference (altitude difference) Δz between the acquired altitude z0 and the altitude z of the determined current position P (step A13). The CPU 31 compares the calculated altitude difference Δz with the altitude difference threshold value THz. When the altitude difference Δz is equal to or less than the altitude difference threshold value THz (step A15: YES), the CPU 31 compares the position counter value with the position counter threshold value THcp. When the position counter value is equal to or greater than the position counter threshold value THcp (step A17: YES), the CPU 31 compares the time counter value with the time counter threshold value THct. When the time counter value is equal to or greater than the time counter threshold value THct (step C19: YES), the CPU 31 performs a Z-count wait determination process to determine whether or not to wait for the Z-count to be decoded (step C21).

Figure 12:
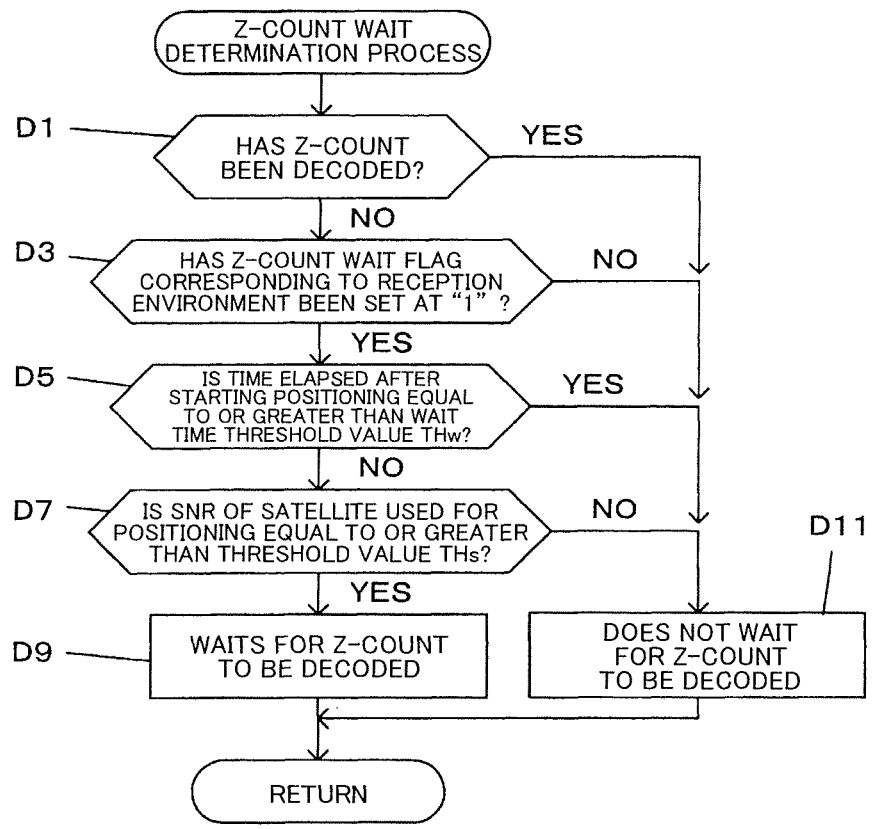
FIG. 12 is a flowchart showing a Z-count wait determination process performed during a baseband process.

FIG. 12 is a flowchart illustrative of the flow of the Z-count wait determination process. As shown in FIG. 12, the CPU 31 determines whether or not the Z-count has been decoded. When the CPU 31 has determined that the Z-count has been decoded (step D1: YES), the CPU 31 determines that it is unnecessary to wait for the Z-count to be decoded (step D11).

When the CPU 31 has determined that the Z-count has not been decoded (step D1: NO), the CPU 31 determines the Z-count wait flag corresponding to the reception environment referring to the Z-count wait table 44. When the Z-count wait flag has been set at "0" (step D3: NO), the CPU 31 determines that it is unnecessary to wait for the Z-count to be decoded (step D11).

When the Z-count wait flag has been set at "1" (step D3: YES), the CPU 31 compares the time elapsed after starting positioning with a given wait time threshold value THw. The wait time threshold value THw is a threshold value for the time required for decoding the Z-count. Specifically, since the Z-count is decoded when one subframe has been decoded, the wait time threshold value THw is set at a time (e.g., about 7 to 10 seconds) that is longer than the cycle (6 seconds) of the subframe.

When the elapsed time is equal to or greater than the wait time threshold value THw (step D5: YES), the CPU 31 determines that it is unnecessary to wait for the Z-count to be decoded (step D11). When the elapsed time is less than the wait time threshold value THw (step D5: NO), the CPU 31 determines whether or not the Z-count can be decoded. The CPU 31 determines whether or not the Z-count can be decoded by determining whether or not a signal with a high signal strength is included in the GPS satellite signals used for positioning. Specifically, the CPU 31 the SNR of each GPS satellite signal used for positioning with a given SNR threshold value THs. When the SNR of one of the GPS satellite signals is equal to or greater than the SNR threshold value THs (step D7: YES), the CPU 31 determines that the Z-count can be decoded, and determines that it is necessary to wait for the Z-count to be decoded (step D9). When the SNR of each GPS satellite signal is less than the SNR threshold value THs (step D7: NO), the CPU 31 determines that the Z-count cannot be decoded, and determines that it is unnecessary to wait for the Z-count to be decoded (step D11). The CPU 31 thus completes the Z-count wait determination process.

When the CPU 31 has determined that it is unnecessary to wait for the Z-count to be decoded as a result of the Z-count wait determination process (step C23: NO), the CPU 31 determines the determined current position P calculated by the current positioning process to be the first located position, and outputs the determined current position P (step C25). When the CPU 31 has determined that it is necessary to wait for the Z-count to be decoded (step C23: YES), the CPU 31 does not output the located position (step C27). The CPU 31 returns to the step A1 and performs the next positioning. The first positioning is thus completed.

The CPU 31 then determines whether or not to finish positioning. When the CPU 31 has determined to continue positioning (step C29: NO), the CPU 31 performs the next positioning. Specifically, the CPU 31 performs positioning calculations to calculate the determined current position P (step C31), and outputs the calculated determined current position P as the located position (step C33). The CPU 31 then returns to the step C29, and determines whether or not to finish positioning. When the CPU 31 has determined to finish positioning (step C29: YES), the CPU 31 finishes the baseband process.

Effects

According to the second embodiment, whether or not to wait for the Z-count to be decoded is determined corresponding to the reception environment. Specifically, since the positioning accuracy is high in the open-sky environment as compared with other environments, the first located position may be output without waiting for the Z-count to be decoded. On the other hand, since the positioning accuracy is low in the multipath environment or the indoor environment as compared with the open-sky environment, it is desirable to output the first located position after the Z-count has been decoded. Therefore, whether to give priority to an increase in positioning accuracy or a reduction in TTFF can be appropriately determined depending on the reception environment by determining whether or not to wait for the Z-count to be decoded corresponding to the reception environment.

Modification

Embodiments to which the invention may be applied are not limited to the above-described embodiments. Various modifications and variations may be made without departing from the spirit and scope of the invention.

(A) Counter Threshold Value

In the above-described embodiments, the counter threshold value is set at a fixed value (e.g., "5"). Note that the counter threshold value may be changed corresponding to the reception environment.

(B) Convergence Condition

In the above-described embodiments, the convergence condition is set to be an OR condition (i.e., "the position count value is equal to or greater than the position counter threshold value THcp" or "the time count value is equal to or greater than the time counter threshold value THct"). Note that the convergence condition may be a combinational condition of the position counter value and the time counter value. For example, when the reception environment is the open-sky environment, the convergence condition is set to be a condition whereby the sum of the time counter value and the position counter value is equal to or larger than "2". When the reception environment is the multipath environment, the convergence condition is set to be a condition whereby the time counter value and the position counter value are respectively equal to or larger than "1".

(C) Acquisition of Reference Altitude

In the above-described embodiments, the reference altitude is acquired from the altitude table 42. Note that the reference altitude may be acquired from the outside of the portable telephone 1 instead of the altitude table 42. For example, the position of a base station of the portable telephone 1 is received from the base station through the portable telephone antenna 80, and whether or not the altitude difference condition is satisfied is determined using the altitude of the received position of the base station as the reference altitude.

(D) Assist GPS

In the above-described embodiments, the current position is located using only the received GPS satellite signals. Note that positioning of the above-described embodiments may be performed by utilizing an assist GPS function that receives the position of a portable telephone base station from the portable telephone base station and locates the current position using the position of the portable telephone base station as the initial position, or receives data such as an ephemeris from a portable telephone base station to perform positioning.

(E) Host CPU

Some or all of the processes performed by the CPU 31 of the baseband process circuit section 30 may be performed by the host CPU 61 by means of software.

(F) Positioning Device

The above embodiments have been described taking an example of a portable telephone (i.e., an electronic instrument including a positioning device). Note that the invention may also be applied to other electronic instruments such as a portable navigation system, a car navigation system, a personal digital assistant (PDA), and a wristwatch.

(G) Satellite Positioning System

The above embodiments have been described taking an example utilizing the GPS. Note that the invention may also be applied to other satellite positioning systems such as the global navigation satellite system (GLONASS).

(H) Recording Medium

The baseband program 41 may be recorded on a recording medium such as a CD-ROM, and installed in an electronic instrument such as a portable telephone.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A position determination method comprising:
performing a positioning process that calculates a located position using satellite signals;
determining whether or not a convergence condition is satisfied based on a currently calculated located position, the convergence condition being specified as a condition for determining whether or not positioning results of the positioning processes have converged;
acquiring a reference altitude corresponding to the currently calculated located position from given altitude information or a given server;
determining whether or not a difference between the altitude of the currently calculated located position and the acquired reference altitude satisfies a given altitude difference condition; and
determining the currently calculated located position to be an output position when it has been determined that (1) the altitude difference condition is satisfied, and (2) the convergence condition is satisfied.

2. The position determination method as defined in claim 1, further comprising:
determining a reception environment of the satellite signals; and
changing the altitude difference condition corresponding to the determined reception environment.

3. The position determination method as defined in claim 2, the reception environment being an open-sky environment, a multipath environment, or an indoor environment.

4. The position determination method as defined in claim 1, further comprising:
determining whether or not a Z-count included in one of the satellite signals has been decoded,
the determining of the output position including determining the currently calculated located position to be the output position when it has been determined that (1) the altitude difference condition is satisfied, (2) the convergence condition is satisfied, and (3) the Z-count has been decoded.

5. The position determination method as defined in claim 1, further comprising:
determining a probability that a Z-count included in one of the satellite signals is decoded,
the determining of the output position including determining the currently calculated located position to be the output position when it has been determined that (1) the altitude difference condition is satisfied, (2) the convergence condition is satisfied, and (3) there is no probability that the Z-count is decoded.

6. The position determination method as defined in claim 1, further comprising:
determining a reception environment of the satellite signals; and
determining whether or not to wait for a Z-count included in one of the satellite signals to be decoded,
the determining of the output position including determining the currently calculated located position to be the output position when it has been determined that (1) the altitude difference condition is satisfied, (2) the convergence condition is satisfied, and (3) it is unnecessary to wait for the Z-count to be decoded.

7. A positioning device comprising:
a positioning calculation section that performs a positioning process that calculates a located position using satellite signals;
a convergence determination section that determines whether or not a convergence condition is satisfied based on a currently calculated located position, the convergence condition being specified as a condition for determining whether or not positioning results of the positioning processes have converged;
an altitude difference condition determination section that acquires a reference altitude corresponding to the currently calculated located position from given altitude information or a given server when the positioning process is performed, and determines whether or not a difference between the altitude of the currently calculated located position and the acquired reference altitude satisfies a given altitude difference condition; and
an output position determination section that determines the currently calculated located position to be an output position when it has been determined that (1) the altitude difference condition is satisfied, and (2) the convergence condition is satisfied.

* * * * *